(12) United States Patent
Miyasaka et al.

(10) Patent No.: US 9,522,841 B2
(45) Date of Patent: Dec. 20, 2016

(54) WHITE GLASS

(71) Applicant: Asahi Glass Company, Limited, Chiyoda-ku (JP)

(72) Inventors: Junko Miyasaka, Tokyo (JP); Seiki Ohara, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 14/957,832

(22) Filed: Dec. 3, 2015

(65) Prior Publication Data

US 2016/0083289 A1 Mar. 24, 2016

Related U.S. Application Data

(63) Continuation of application No. PCT/JP2014/064039, filed on May 27, 2014.

(30) Foreign Application Priority Data

Jun. 3, 2013 (JP) ................... 2013-117128

(51) Int. Cl.
  C03C 3/097 (2006.01)
  C03C 3/095 (2006.01)
  C03C 4/02 (2006.01)
  C03C 21/00 (2006.01)
  C03C 1/04 (2006.01)
  C03C 4/00 (2006.01)
  C03B 32/00 (2006.01)
  G06F 1/16 (2006.01)

(52) U.S. Cl.
  CPC .............. *C03C 3/097* (2013.01); *C03B 32/00* (2013.01); *C03C 1/04* (2013.01); *C03C 3/095* (2013.01); *C03C 4/005* (2013.01); *C03C 4/02* (2013.01); *C03C 21/002* (2013.01); *G06F 1/16* (2013.01)

(58) Field of Classification Search
  CPC ............ C03C 3/097; C03C 3/095; C03C 4/02; C03C 1/04; C03C 4/005; C03C 21/001; C03C 21/002
  See application file for complete search history.

(56) References Cited

U.S. PATENT DOCUMENTS

| 4,337,295 A * | 6/1982 | Rittler ..................... C03C 3/089 428/410 |
|---|---|---|
| 6,745,057 B1 | 6/2004 | Hankui |
| 2005/0127544 A1* | 6/2005 | Brodkin ................. A61C 13/26 264/16 |
| 2008/0254965 A1* | 10/2008 | Ishioka ................... C03C 3/062 501/64 |

FOREIGN PATENT DOCUMENTS

| JP | 8-277142 | 10/1996 |
| JP | 3838815 | 10/2006 |

OTHER PUBLICATIONS

International Search Report issued Sep. 2, 2014 in PCT/JP2014/064039, filed May 27, 2014 (with English Translation).
Written Opinion issued Sep. 2, 2014 in PCT/JP2014/064039, filed May 27, 2014.

* cited by examiner

*Primary Examiner* — Elizabeth A Bolden
(74) *Attorney, Agent, or Firm* — Oblon, McClelland, Maier & Neustadt, L.L.P.

(57) ABSTRACT

A white glass includes, in terms of mole percentage on the basis of oxides, from 50 to 73% of $SiO_2$, from 0 to 10% of $B_2O_3$, from 3 to 17% of $Na_2O$, from 0.5 to 10% of at least one of $Nb_2O_5$ and $Gd_2O_3$, and from 0.5 to 10% of $P_2O_5$. In the white glass, a total content RO of MgO, CaO, SrO and BaO is from 2 to 25%.

16 Claims, No Drawings

WHITE GLASS

TECHNICAL FIELD

The present invention relates to a white glass which can be suitably used for an exterior member of an electronic device such as a portable and usable communication or information device.

BACKGROUND ART

For housings of electronic devices such as a mobile phone, considering various factors such as decorativeness, scratch resistance, processability and cost, those chosen as appropriate from resins have been used. A housing of a portable terminal in particular has been often constituted of materials such as plastics or resins (see Patent Document 1)

PRIOR ART DOCUMENTS

Patent Document

Patent Document 1: Japanese Patent No. 3838815

SUMMARY OF THE INVENTION

Problems that the Invention is to Solve

However, when a housing is constituted of materials such as plastics or resins, there is a problem that the housing is prone to scratches. An object of the present invention is therefore to provide a scratch-resistant white glass having a light shielding property, suitable for use as housings of electronic devices.

Means for Solving the Problems

The present inventors have found that a glass having a composition containing specific elements is a scratch-resistant white glass suitable for use as housings of electronic devices, and have completed the present invention.

That is, the present invention provides the followings.

1. A white glass comprising, in terms of mole percentage on the basis of oxides, from 50 to 73% of $SiO_2$, from 0 to 10% of $B_2O_3$, from 3 to 17% of $Na_2O$, from 0.5 to 10% of at least one of $Nb_2O_5$ and $Gd_2O_3$, and from 0.5 to 10% of $P_2O_5$, wherein a total content RO of MgO, CaO, SrO and BaO is from 2 to 25%.
2. The white glass according to the above item 1, which comprises, in terms of mole percentage on the basis of oxides, 0.5% or more of $Nb_2O_5$.
3. The white glass according to the above item 1 or 2, wherein a linear transmittance of light having a wavelength of 600 nm at a thickness of 1 mm is 0.5% or less.
4. The white glass according to any one of the above items 1 to 3, wherein a total light reflectance of light having a wavelength of 600 nm is 70% or more.
5. The white glass according to any one of the above items 1 to 4, wherein a surface compressive stress layer or a layer ion-exchanged from a surface thereof has a thickness of 10 μm or more.
6. The white glass according to any one of the above items 1 to 5, comprising, in terms of mole percentage on the basis of oxides, from 55 to 65% of $SiO_2$, from 0 to 8% of $Al_2O_3$, from 1 to 6% of $B_2O_3$, from 1 to 16% of MgO, from 0 to 16% of BaO, from 6 to 12% of $Na_2O$, from 0 to 5% of $ZrO_2$, from 1 to 8% of $Nb_2O_5$, and from 2 to 8% of $P_2O_5$, wherein a total content RO of MgO, CaO, SrO and BaO is from 2 to 20%.
7. The white glass according to any one of the above items 1 to 6, which further comprises, in terms of mole percentage on the basis of oxides, less than 2% of $La_2O_3$.
8. An electronic device comprising the white glass according to any one of the above items 1 to 7 as a housing.
9. An exterior member comprising the white glass according to any one of the above items 1 to 7.

Advantageous Effects of the Invention

According to the present invention, a scratch-resistant white glass suitable as a housing of an electronic device is obtained.

By the way, the electronic device described above includes a display device such as a liquid crystal panel on an outer surface thereof. However, those display devices tend to have high definition and high luminance, and with this tendency, a backlight as a light source tends to have high luminance. Light from a light source is emitted to a display device side, and in addition to this, frequently multiply reflects in the inside of a device and reaches a rear surface of an exterior housing.

Even in an organic EL (Electro-Luminescence) display that does not require a light source, similarly, there is concern over light leakage from a light-emitting element. In the case of using a metal as a material of a housing, the problem does not occur, but in the case where a material is a white material but has translucency, there is a possibility that light from a light source passes through the housing and is recognized from the outside of the device. In the case of using such a translucent white material in a housing, a light-shielding means such as a coating film for imparting a light-shielding property to a visible light (hereinafter simply referred to as a "light-shielding property") for the white material is formed on a rear surface of a glass.

However, with high luminance of a light source of a display device as described above, in order to form a coating film having sufficient light-shielding property on a rear surface (a device side) of the translucent white material, it is necessary to form a thick coating film or form a film including a plurality of layers, and this increases the number of steps, leading to the increase of cost.

Furthermore, in the case where a coating film is not uniformly formed, light passes through only a thin portion of the coating film, and a housing is locally recognized brightly, and thus, beauty of the device may be impaired. For example, in a concave housing, it is necessary to form a uniform film on the entire surface of a concave surface side. However, a step of uniformly forming a coating film having sufficient light-shielding property on the concave surface is complicated, and this leads to the increase of cost.

Particularly, in the case of obtaining a housing having white appearance, it is assumed that a white coating layer should be formed on at least one surface of the translucent white material as described above. However, a white coating material has high translucency, and even though a thickness of the white coating layer is increased, sufficient light-shielding property cannot be obtained.

For this reason, it is assumed that a black coating layer having high light-shielding property should be laminated to the white coating layer. However, in this case, it is necessary to increase a thickness of the white coating layer to an extent such that the black coating layer is not recognized. Thus, to obtain a white-colored housing having high light-shielding property using a white coating material, there is a problem that cost is very high.

The white glass in the present invention is a phase-separated glass containing at least one of $Nb_2O_5$ and $Gd_2O_3$. The phase-separated glass is separated into two layers of a droplet phase as a phase having small volume fraction and a matrix phase having large volume fraction. $Nb_2O_5$ and $Gd_2O_3$ are high refractive index components, and are preferentially distributed in one phase, preferably the droplet phase, of the phase-separated glass. By this, in the white glass in the present invention, the difference in refractive index between phase-separated glasses (between matrix phase and droplet phase) is increased, and scattering intensity of light by a phase separation structure is increased, thereby showing excellent light-shielding property.

Therefore, according to the present invention, a white material having low translucency can be obtained, and without additionally providing a light-shielding means like the light-shielding film as described before, a white glass having the light-shielding property suitable for housings of electronic devices can be obtained at a low price. In addition, a white glass usable for housings with designability can be obtained at a low price.

MODE FOR CARRYING OUT THE INVENTION

The white glass in the present invention is a phase-separated glass, and in order to obtain sufficient light-shielding property in the white glass, it is necessary to increase scattering intensity of light by a phase separation structure. The phase-separated glass is separated into two layers of a droplet phase as a phase having small volume fraction and a matrix phase having large volume fraction. By increasing the difference in refractive index between the matrix phase and the droplet phase in the phase-separated glass, scattering intensity of light is enhanced, thereby the white glass can have excellent light-shielding property.

The present inventors have thought that by adding elements having heavy atomic weight such as transition metals and rare earth metals that are high refractive index components and increasing a refractive index of one phase of the phase-separated glass, the difference in refractive index of the phase-separated glass can be increased, and have examined the effect in a light-shielding property of the phase-separated glass on Nb, Gd, Ti, Zr, Ta, Y and La that are known as high refractive index components for a transparent glass such as lenses.

As a result, it has been understood that any element may not be added even though it is a high refractive index component, and of the elements described above, particularly Nb and Gd are preferentially distributed in the droplet phase having small volume fraction. Therefore, they have found that by containing at least one of Nb and Gd in a glass composition and effectively increasing a refractive index of the droplet phase, the difference in refractive index between the droplet phase and the matrix phase is increased, and thus, the light-shielding property of the phase-separated glass can be effectively improved.

It is conventionally known that transition metals and rare earth metals are high refractive index components. But, these materials are used in a transparent glass for use in lenses as described above. Characteristics that dependency in which a refractive index varies depending on a wavelength is increased or characteristics that ability of bending light is high are merely utilized, and those metals are not used for increasing the light-shielding property of the phase-separated glass.

The white glass in the present invention includes, in terms of mole percentage on the basis of oxides, from 50 to 73% of $SiO_2$, from 0 to 10% of $B_2O_3$, from 3 to 17% of $Na_2O$, from 0.5 to 10% of at least one of $Nb_2O_5$ and $Gd_2O_3$, and from 0.5 to 10% of $P_2O_5$, wherein a total content RO of MgO, CaO, SrO and BaO is from 2 to 25%.

In the white glass in the present invention, the reason why the glass components are limited to the above-described ranges is described below. In the description, the contents of the glass components are expressed in terms of mole percentages unless otherwise indicated.

In the white glass in the present invention, $SiO_2$ is a basic component that forms a network structure of a glass. That is, $SiO_2$ constitutes an amorphous structure and develops excellent mechanical strength, weather resistance or luster as a glass.

The content of $SiO_2$ is 50% or more, preferably 53% or more, more preferably 55% or more, and still more preferably 57% or more, and is 73% or less, preferably 70% or less, more preferably 68% or less, and still more preferably 65% or less.

When the content of $SiO_2$ is 50% or more, weather resistance or scratch resistance as a glass is improved. On the other hand, when the content of $SiO_2$ is 73% or less, a melting temperature of a glass is not excessively increased.

$B_2O_3$ is not an essential component, but is preferably contained in an amount of 0.5% or more not only in order to improve melting properties of glass, but in order to improve a light-shielding property of glass and reduce a thermal expansion coefficient of glass, and additionally in order to improve weather resistance.

The content of $B_2O_3$ is 10% or less, preferably 8% or less, and more preferably 6% or less, and is preferably 0.5% or more, more preferably 1% or more, still more preferably 2% or more, and particularly preferably 3% or more.

When the content of $B_2O_3$ is 10% or less, unevenness of whiteness of glass can be avoided. In the case of suppressing volatilization, the content of $B_2O_3$ is preferably 4% or less.

The content of $Na_2O$ is 3% or more, preferably 5% or more, more preferably 8% or more, and still more preferably 9% or more, and is 17% or less, preferably 14% or less, more preferably 12% or mess, and still more preferably 10% or less.

$Na_2O$ has the effect of improving melting properties of glass. When the content of $Na_2O$ is 3% or more, the effect of the content is sufficiently obtained. On the other hand, when the content of $Na_2O$ is 17% or less, the deterioration of weather resistance of glass can be prevented, and additionally, the deterioration of a light-shielding property can be prevented.

Particularly in the case of imparting a light-shielding property to glass, the content of $Na_2O$ is preferably 12% or less, and more preferably 11% or less. Furthermore, in the case of heightening strength of glass through an ion-exchange treatment, the content of $Na_2O$ is preferably 6% or more.

The content of at least one of $Nb_2O_5$ and $Gd_2O_3$ is 0.5% or more, preferably 1% or more, more preferably 2% or more, and still more preferably 3% or more, and is 10% or less, preferably 8% or less, more preferably 6% or less, and still more preferably 5% or less.

When the content of at least one of $Nb_2O_5$ and $Gd_2O_3$ is 0.5% or more, the effect of increasing the difference in refractive index of a glass phase-separated into two layers is sufficiently obtained, thereby improving a light-shielding property. On the other hand, when the content of at least one of $Nb_2O_5$ and $Gd_2O_3$ is 10% or less, glass can be prevented from becoming brittle.

The content of $Nb_2O_5$ is preferably 0.5% or more, more preferably 1% or more, still more preferably 2% or more, and particularly preferably 3% or more, and is preferably 10% or less, more preferably 8% or less, still more preferably 6% or less, and particularly preferably 5% or less.

When the content of $Nb_2O_5$ is 0.5% or more, the effect of increasing the difference in refractive index of a glass phase-separated into two layers is sufficiently obtained, and a light-shielding property can be improved. On the other hand, when the content of $Nb_2O_5$ is 10% or less, glass can be prevented from becoming brittle.

The content of $Gd_2O_3$ is preferably 0.5%, more preferably 1% or more, still more preferably 2% or more, and particularly preferably 3% or more, and is preferably 10% or less, more preferably 8% or less, still more preferably 6% or less, and particularly preferably 5% or less.

When the content of $Gd_2O_3$ is 0.5% or more, the effect of increasing the difference in refractive index of a glass phase-separated into two layers is sufficiently obtained, and a light-shielding property can be improved. On the other hand, when the content of $Gd_2O_3$ is 10% or less, glass can be prevented from becoming brittle.

$P_2O_5$ is a basic component that remarkably accelerates whitening of glass, and is an essential component. The content of $P_2O_5$ is 0.5% or more, preferably 2% or more, and more preferably 4% or more, and is 10% or less, preferably 8% or less, more preferably 7% or less, and still more preferably 6% or less.

When the content of $P_2O_5$ is 0.5% or more, a light-shielding property of glass becomes sufficient. On the other hand, when the content of $P_2O_5$ is 10% or less, sublimation is difficult to be generated, unevenness in whiteness is reduced, and the appearance of the glass can be inhibited from being impaired.

MgO, CaO, SrO and BaO are components having the effect of increasing a light-shielding property, and the glass is required to contain at least any one of those.

MgO is not an essential component, but the glass preferably contains MgO in an amount up to 18% in order to enhance a light-shielding property by increasing phase separation coupled with $SiO_2$ and $Na_2O$. The content of MgO is preferably 18% or less, more preferably 11% or less, still more preferably 10% or less, and particularly preferably 9% or less. When the content of MgO is 18% or less, the case where a light-shielding property is deteriorated can be prevented.

In the case where the glass contains MgO, the content thereof is more than 0.5%, preferably 3% or more, more preferably 5% or more, and still more preferably 7% or more. When the content of MgO is more than 0.5%, the effect of improving a light-shielding property by increasing phase separation can be sufficiently obtained.

In the case where the glass contains CaO, the content thereof is preferably 1% or more, and more preferably 2% or more, and is preferably 7% or less, more preferably 6% or less, and still more preferably 5% or less. When the content of CaO is 7% or less, devitrification of the glass can be prevented.

In the case where the glass contains SrO, the content thereof is preferably 1% or more, and more preferably 2% or more, and is preferably 10% or less, and more preferably 8% or less. When the content of SrO is 10% or less, devitrification of the glass can be prevented BaO has the greater effect of promoting a light-shielding property than other alkaline earth metal. In the case where the glass contains BaO, the content thereof is preferably 1% or more, more preferably 3% or more, and still more preferably 5% or more, and is preferably 12% or less, more preferably 10% or less, and still more preferably 9% or less. When the content of BaO is 12% or less, devitrification of the glass can be prevented. In the case of intending to obtain a glass having scratch-resistance, the content of BaO is preferably 8% or less, more preferably 5% or less, and still more preferably 2% or less.

The total content RO of MgO, CaO, SrO and BaO is 2% or more, preferably 4% or more, more preferably 6% or more, and still more preferably 8% or more, and is 25% or less, preferably 20% or less, more preferably 16% or less, and still more preferably 12% or less.

When the total content RO of MgO, CaO, SrO and BaO is 2% or more, the increase of the melting temperature can be prevented. On the other hand, when the total content RO of MgO, CaO, SrO and BaO is 25% or less, the glass becomes difficult to cause devitrification.

$Al_2O_3$ has the function of improving chemical durability of glass, and has the effects of remarkably improving dispersion stability between $SiO_2$ and other components and giving the function of homogenizing the separated phase of glass.

The content of $Al_2O_3$ is preferably 1% or more, more preferably 2% or more, and still more preferably 3% or more, and is preferably 8% or less, more preferably 7% or less, still more preferably 6% or less, particularly preferably 5% or less, and most preferably 4% or less.

When the content of $Al_2O_3$ is 1% or more, the effects can be sufficiently obtained. In the case of intending to improve chemically strengthening characteristics by ion exchange, the content of $Al_2O_3$ is preferably 3% or more, and more preferably 4% or more. On the other hand, when the content of $Al_2O_3$ is 8% or less, the melting temperature of glass can be prevented from being increased, and a light-shielding property can be prevented from being decreased.

$ZrO_2$ is not an essential component, but may be contained in an amount up to 5% in order to, for example, improve chemical durability. The content of $ZrO_2$ is preferably 4% or less, and more preferably 3% or less. When the content of $ZrO_2$ is 5% or less, a light-shielding property can be prevented from being deteriorated. In the case where the glass contains $ZrO_2$, the content thereof is preferably 0.5% or more. When the content of $ZrO_2$ is 0.5% or more, the effect by containing $ZrO_2$ can be sufficiently obtained.

$TiO_2$ is not an essential component, but may be contained in a range of 5% or less in order to increase Young's modulus. In the case where the glass contains $TiO_2$, the content thereof is preferably 0.5% or more. When the content of $TiO_2$ is 5% or less, the devitrification temperature of glass can be prevented from being increased. The content of $TiO_2$ is preferably 5% or less, and more preferably 3% or less.

$K_2O$ is not an essential component, but may be contained in a range of 5% or less in order to increase a depth of a compressive stress layer (DOL) by ion-exchange treatment. In the case where the glass contains $K_2O$, the content thereof is preferably 0.5% or more. When the content of $K_2O$ is 5% or less, surface compressive stress (CS) in ion-exchange treatment can be prevented from being decreased. The content of $K_2O$ is preferably 5% or less, and more preferably 3% or less.

$Li_2O$ is not an essential component, but may be contained in a range of 5% or less in order to increase Young's modulus. In the case where the glass contains $Li_2O$, the content thereof is preferably 0.5% or more. When the content of $Li_2O$ is 5% or less, the devitrification temperature of glass can be prevented from being increased. The content of $Li_2O$ is preferably 5% or less, and more preferably 3% or less.

The glass in the present invention consists essentially of the components described above, but may further contain other components in a range such that the objects of the present invention are not impaired. In such a case, the total content of the components is preferably 10% or less. The total content of 12 components, $SiO_2$, $Al_2O_3$, $B_2O_3$, MgO, $Na_2O$, $ZrO_2$, $P_2O_5$, CaO, SrO, $Nb_2O_5$, $Gd_2O_3$ and BaO, is preferably 90% or more, and typically 94% or more.

Examples of the other components than those described above include the following cases.

$La_2O_3$ is not an essential compound, but can be contained for the purpose of improving a light-shielding property of glass. The content of $La_2O_3$ is preferably 0.5% or more. In order to prevent the glass from becoming brittle, the content is preferably 5% or less, more preferably 3% or less, and still more preferably 2% or less.

The glass may further contain, for example, Co, Mn, Fe, Ni, Cu, Cr, V, Zn, Bi, Er, Tm, Nd, Sm, Sn, Ce, Pr, Eu, Ag or Au, as a coloring component. Furthermore, two or more kinds of those may be concurrently contained. In such a case, the total content of those coloring components is typically 5% or less in terms of mole percentage based on oxides of minimum valance numbers.

Examples of the color of the glass containing the coloring components described above include the following (a) to (i). The color of a glass which does not contain the coloring components is white. (a) Glass containing $Co_3O_4$ or CoO: bluish purple, (b) glass containing NiO: grayish brown, (c) glass containing MnO or $Mn_2O_3$: purple, (d) glass containing $Cr_2O_3$: greenish brown, (e) glass containing CuO: bluish green, (f) glass containing FeO or $Fe_2O_3$: greenish brown, (g) glass containing $Er_2O_3$: pink, (h) glass containing NiS: grey, and (i) glass containing CdS: yellow.

Preferred embodiments of the white glass in the present invention are described below.

The white glass in the present invention is, for example, externally mounted on an electronic device. A mobile phone has a configuration that a display unit including a liquid crystal panel or an organic EL display and an operating unit including buttons or a combination of display and operating units in one, such as a touch panel, is placed on one of the outer surfaces of a mobile phone and the peripheries thereof are surrounded with a casing material.

The other of outer surfaces is formed of a panel. A frame member is placed in a space between one outer surface and the other outer surface, namely a thickness portion of the device. The casing member and frame member, or the panel and the frame member may be formed into a single piece in some cases.

The white glass in the present invention can be used for any of the above-described casing member, panel and frame member. In addition, these members each may have a flat shape, and a combination structure of casing member and frame member or a combination structure of panel and frame member may be concave in shape or convex in shape.

The light source of a display device installed in the interior of an electronic device is constituted of a white light emission unit, such as a light-emitting diode, organic EL or CCFL. In addition, there is a light source having a light-emitting element to emit white light or the like without using the light emission unit, such as an organic EL display. When white light leaks into the outside of a device through a white glass housing, the device does not look fine. Therefore, it is preferable that the white glass housing has the property of surely shielding white light.

Reasons why the white glass in the present invention is suitable for housings are as follows. The white glass is a glass (phase-separated glass) in the interior of which fine particles in a separated state are precipitated, and it has excellent mechanical strength and scratch resistance. The particles in the separated phase in the glass diffuse, reflect and scatter light at their boundaries, and thus, an appearance of the glass shows a white color.

The white glass in the present invention makes it difficult for white light passing through the glass (light from a light source of a display device) to be perceived on the surface side of the glass by utilizing the light-scattering property of phase-separated glass or it has designability.

In the white glass and strengthened white glass in the present invention (hereinafter there are cases where both of them are collectively called the white glass without drawing a distinction between them), the linear transmittance of light having a wavelength of 600 nm at a thickness of 1 mm is preferably 0.5% or less, more preferably 0.3% or less, still more preferably 0.2% or less, and particularly preferably 0.1% or less. When the linear transmittance of light having a wavelength of 600 nm at a thickness of 1 mm is 1% or less, a light-shielding property can be improved.

In the white glass and strengthened white glass in the present invention, the total light reflectance $R_{600}$ of light having a wavelength of 600 nm is preferably 70% or more, and typically 80% or more. When $R_{600}$ is 70% or more, the glass has sufficient light-shielding property.

Phase separation in glass means that single-phase glass is separated into two or more glass phases. Examples of a method for causing phase separation in glass include a method of giving heat treatment to glass after forming the glass and a method of holding glass at a temperature equal to or higher than its phase separation temperature before forming the glass.

In order to impart a light-shielding property to a phase-separated glass, an average size of one phase in a phase-separated state or an average particle size of a dispersed phase in a phase-separated glass is preferably from 40 to 5,000 nm, more preferably from 50 to 3,000 nm, and still more preferably from 100 to 2,000 nm.

The average particle diameter of the disperse phase can be measured SEM observation. An average size of one phase in a phase-separated state is an average of widths of phases that are mutually and continuously intertwined, in a spinodal state, is a diameter in the case where one phase is spherical, in a binodal state, and is an average value of a long diameter and a short diameter in the case where one phase is an oval sphere state. Furthermore, the average particle diameter of phase-separated phases is the above-described average size in the case of a binodal state.

In order to impart a light-shielding property to a phase-separated glass, it is preferable that the difference in refractive index between particles of a disperse phase in a phase-separated glass and matrixes around the particles is large. Furthermore, a proportion of volume of a disperse phase in a phase-separated glass is preferably 5% or more, more preferably 10% or more, and still more preferably 15% or more. The proportion of volume of particles in a disperse phase is obtained by calculating the proportion of disperse particles distributed on a glass surface from SEM observation photograph and estimating the proportion of the disperse particles.

Phase separation may involve crystallization. There is possibility that the crystallization contributes to whitening. For this reason, a composite phase of separated phase+crystal phase is not particularly excluded. However, glasses that are crystallized to an extent of involving decrease of strength, increase of ion-exchange temperature and decrease of ion-exchangeability (compressive stress and stress layer thickness) are not preferable. Volume/(volume of particles in disperse phase+volume of crystal particles) is preferably 50% or less, preferably 20% or less, more preferably 10% or less, and still more preferably 1% or less. The ratio is typically 0%.

As to conditions under which heat treatment of the glass is carried out for phase separation, typically, the temperature for the heat treatment is preferably 50 to 400° C. higher, and more preferably 100 to 300° C., higher than the glass transition point or annealing point of the glass, and time for heat treatment of the glass is preferably from 1 to 64 hours, and more preferably from 2 to 32 hours. From the viewpoint of mass productivity, the time for the heat treatment is preferably 24 hours or less, and more preferably 12 hours or less.

As the method of holding glass at a temperature equal to or higher than its phase separation temperature in glass before forming the glass, a method of causing phase separation in glass by holding the glass at a temperature equal to or lower than the phase separation starting temperature, and higher than 1,000° C. is preferable. Because phase separation is performed at a high temperature, it becomes possible to impart a light-shielding property to the glass in a short time.

Whether or not the glass is phase-separated can be determined by SEM (scanning electron microscope). In the case where glass is phase-separated, separation into two or more phases can be observed by SEM.

The white glass obtained by subjecting to the heat treatment under the conditions falling within the above-described ranges easily undergoes ion exchange, and the ion-exchange treatment can give not only the light-shielding property but also high strength suitable for housings to the phase-separated glass.

The phase-separated glass in the present invention is in a whitened state. When the phase-separated glass which has been whitened, thereby having the light-shielding property, is formed into housings, housings having white appearance and providing high light-shielding property can be obtained at low cost without using additional light-shielding means. In addition, the housings obtained can have designability.

The suitable time spent in performing ion-exchange treatment is preferably from 1 to 72 hours, and more preferably from 2 to 24 hours. For productivity improvement, the ion-exchange treatment time is preferably 12 hours or less. As an example of the molten salt, examples thereof include $KNO_3$. More specifically, it is typical to immerse a glass, for example, in $KNO_3$ molten salt of from 400 to 500° C. for from 1 to 72 hours.

For allowing the effect of enhancing the strength by chemical strengthening to be efficient, it is desirable that there exist a surface compressive stress layer having a depth larger than the depth of microcracks formed on the glass surface and the depth of the surface compressive stress layer generated by chemical strengthening be 10 μm or more. In addition, when the glass suffers scratches deeper than the depth of the surface stress layer during the use thereof, such scratches lead to fracture of the glass. It is therefore desirable for the surface compressive stress layer to have a larger depth, and the depth of the surface compressive stress layer is more preferably 15 μm or more, still more preferably 20 μm or more, and typically 30 μm or more.

On the other hand, when the depth of the surface compressive stress layer is large, the internal tensile stress becomes great, resulting in the great shock at the time of fracture. In other words, it has been found that when the internal tensile stress is great, the glass is apt to shatter into fine pieces and scatter at the time of fracture. As to the glass having a thickness of 1 mm or less, scattering of shattered pieces of the glass became serious when the depth of the surface compressive stress layer exceeds 70 μm.

The desirable depth of the surface compressive stress layer in the strengthened white glass in the present invention is therefore 70 μm or less. As to the white glass for housings in the present invention, it is also thought that, depending on the electronic devices on which the white glass is to be externally mounted, the surface compressive stress layer should be adjusted to have a small depth for safety in uses, e.g., as panels having a high probability of occurrence of contact scratches on the surface. Hence, the depth is more preferably 60 μm or less, still more preferably 50 μm or less, and typically 40 μm or less.

In addition, the surface compressive stress is preferably 300 MPa or more, and more preferably 400 MPa or more.

The surface compressive stress CS (unit: MPa) and the thickness of the compressive stress layer DOL (unit: μm) of the white glass in the present invention can be determined by birefringence measurements so long as the white glass is pervious to light. In addition, the depth of the surface compressive stress layer can be measured by EPMA (Electron Probe Micro Analyzer) or so on.

The white glass in the present invention may be formed into not only a flat plate shape, but a concave shape or a convex shape. In this case, a glass formed into a flat plate or a block may be reheated and press-formed in a molten state. Furthermore, the glass may be formed into a desired shape by a so-called a direct press method in which a molten glass is directly cast on a press mold and then press-formed. Furthermore, a portion corresponding to a display unit or connector of electronic devices may be subjected to processing simultaneously with press forming, or may be subjected to cutting after press forming. The forming method is not limited to those methods.

The white glass in the present invention has excellent mechanical strength. Therefore, the white glass can be preferably used for the white glass housing of the portable electronic device which is required to have high strength for housing. The meaning of the portable electronic device includes, as a concept, a portable and usable communication device or information device.

Examples of the communication device include a mobile phone, PHS (Personal Handy-phone System), a smart phone, PDA (Personal Data Assist) and PND (Portable Navigation Device, portable car navigation system), as a communication terminal, and include a portable radio, a portable television and a one-segment receiver, as a broadcasting receiver.

Examples of the information device include a digital camera, a video camera, a portable music player, a sound recorder, a portable DVD player, a portable game machine, a notebook computer, a tablet PC, an electronic dictionary, an electronic organizer, an electronic book reader, a portable printer and a portable scanner. They are not limited to the exemplifications.

A portable electronic device having high strength and beauty can be obtained by using the white glass in the present invention in those portable electronic devices, and when the strengthened white glass in the present invention is used, the higher strength can be obtained.

The white glass in the present invention which has high strength and beautiful appearance can also be applied to electronic devices other than portable electronic devices (for example, housings of desktop personal computers), household electric appliances (for example, large-sized televisions), building members, automobile members, tableware, lighting members (for example, scattering plates), reflecting members and furniture.

On the housing for a portable electronic device in the present invention, a conductor pattern may be formed, and the front or rear surface of the housing can be used as a place for forming the pattern. In addition, the whole or a part of the conductor pattern may have a high frequency circuit function such as an antenna or a filter. In this case, the portable electronic device has a connecting means of some kind between the conductor pattern formed on the housing and a circuit in the electronic device. Examples of the connecting means include a cable, a flexible substrate, a pin using springs, and contact through a mechanism having elasticity of some kind.

EXAMPLES

Example 1

Production of Glass

In each of Examples 1 to 27, glass raw materials were appropriately selected from glass raw materials generally used such as oxides, hydroxides, carbonates and sulfates so as to have a composition specified by mole percentages in each column of from $SiO_2$ to $Li_2O$, as shown in Tables 1 to 3, followed by weighing them so to be the weight of 400 g as a glass, and mixing those. Subsequently, the resulting mixture was put in a platinum crucible, the crucible was placed in a resistance heating electric furnace of 1,600° C., and the mixture was melted for 3 hours, and then subjected to defoaming and homogenizing. The resulting melt was poured into a mold, maintained for 1 hour at a temperature which is shown in the row of $T_A$ in Table 1 and has a unit of ° C., followed by cooling to room temperature at a cooling rate of 1° C. per minute. Thus, the glass (untreated glass) was obtained in each Example.

In Tables 1 to 3, "$Nb_2O_5+Gd_2O_3$" is the total content of $Nb_2O_5$ and $Gd_2O_3$. "MgO+CaO+SrO+BaO" is the total content of MgO, CaO, SrO and BaO. In addition, the glass transition point Tg and yield point are expressed in units of ° C. in the Tables.

For example, the glass in Example 22-1 and the glass in Example 22-2 were the same in themselves, but the glass of Example 22-1 was an untreated glass, while the glass in Example 22-2 was a glass obtained by subjecting the untreated glass to heat treatment described hereinafter. In addition, the glasses in Examples 1 to 20, 23, 24, 26 and 27 were untreated glasses. Examples 1 to 24 are working examples, Examples 25 to 27 are comparative examples, and Examples 22-1 is also a working example.

In Examples 22-2, 25-2 and 25-3, the glasses were subjected to heat treatment under the conditions shown in the row of heat treatment shown in Tables 1 to 3, followed by cooling to room temperature. Heating up to the their respective temperatures shown in the row of heat treatment shown in Tables 1 to 3 and cooling from their respective temperatures were both carried out at a rate of 5° C./min.

The glasses in which the treatment temperature and treatment time were shown in the row of heat treatment in Tables 1 to 3 indicate glasses which have been subjected to the heat treatment, and the glasses indicating "untreated" are untreated glasses which has not been subjected to the heat treatment. The untreated glasses of Examples 1 to 20, 23, 24, 26 and 27 are working examples in which whitening already occurred in the process of making the glass and low transmittances were achieved.

Evaluation Method

The white glasses obtained were evaluated by the following evaluation methods. The results of the following (1) to (3) are shown in Tables 1 to 3.

(1) Linear Transmittance

Transmittances $T_{400}$, $T_{600}$ and $T_{800}$ (unit: %) of light having wavelengths of 400 nm, 600 nm and 800 nm at a thickness of 1 mm were measured as follows, respectively. Samples having a size of about 30 mm×about 30 mm and a thickness of 1 mm in which top and bottom surfaces had been mirror-finished were prepared. A linear transmittance curve of each sample over a wavelength region of from 400 to 800 was obtained using a Hitachi spectrophotometer U-4100, and transmittances at wavelengths of 400 nm, 600 nm and 800 nm were determined therefrom, respectively.

(2) Total Light Reflectance

Samples having a size of about 30 mm×about 30 mm and a thickness of 1 mm in which top and bottom surfaces had been mirror-finished were prepared, and the total light reflectances $R_{400}$, $R_{600}$ and $R_{800}$ (unit: %) of light having wavelengths of 400 nm, 600 nm and 800 nm were measured using a spectrophotometer (Lamda 950) manufactured by PerkinElmer Inc., respectively (3) Surface Compressive Stress (CS) and Depth of Compressive Stress Layer (DOL)

Samples having a size of about 30 mm×about 30 mm and a thickness of 1 mm in which top and bottom surfaces had been mirror-finished were prepared using the white glasses obtained, and then chemically strengthened by ion-exchange treatment in which each sample was immersed for 6 hours in a 100% $KNO_3$ molten salt heated to 450° C. Thereafter, values of surface compressive stress CS (unit: MPa) and depth of a compressive stress layer DOL (unit: μm) were measured on the resulting samples by means of a surface stress meter (FSM-6000) manufactured by Orihara Industrial Co., Ltd.

Examples 1, 2, 4 16 and 25 to 27 show the values of CS by the surface stress meter. Furthermore, Examples 4 to 16 and 25 to 27 show the values of DOL by the surface stress meter. The values marked with "*" in the row of DOL in Tables 1 to 3 are values measured by EDX, not by the surface stress meter.

(4) Devitrification Test

The white glasses in Examples 1 to 4 and 9 to 15 were pulverized in a mortar into glass grains having size of about 2 mm. Those glass grains were placed side by side on a platinum dish, and heat-treated in a resistance heating electric furnace for 24 hours. Thus, a devitrification test was carried out. As a result, the glass grains did not crystallize at 1,300° C. and were in an amorphous state.

(5) Particle Diameter and Proportion of Particles

Particle diameter and proportion of particles of the white glass in Example 3 were measured by observation with SEM. As a result, the particle diameter was 255 nm and the proportion of the particles was 22%.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| $SiO_2$ | 59.7 | 58.7 | 56.7 | 58.4 | 56.7 | 55.7 | 55.7 | 57.6 | 58.6 | 58.6 |
| $Al_2O_3$ | 3.4 | 3.4 | 3.4 | 3.4 | 3.4 | 3.4 | 3.4 | 5.4 | 5.4 | 6.4 |
| $B_2O_3$ | 3.9 | 3.9 | 3.9 | 3.9 | 3.9 | 3.9 | 3.9 | 3.9 | 3.9 | 3.9 |
| MgO | 7.6 | 7.6 | 7.6 | 7.6 | 7.6 | 7.6 | 7.6 | 5.6 | 5.6 | 4.6 |
| $TiO_2$ | 0 | 0 | 0 | 0 | 0 | 0 | 0 | 0 | 0 | 0 |
| $ZrO_2$ | 2.5 | 2.5 | 2.5 | 2.5 | 2.5 | 2.5 | 2.5 | 2.5 | 2.5 | 2.5 |
| $Na_2O$ | 9.3 | 9.3 | 9.3 | 9.2 | 9.3 | 9.3 | 9.3 | 9.3 | 9.3 | 10.3 |
| $K_2O$ | 0 | 0 | 0 | 0 | 0 | 0 | 0 | 0 | 0 | 0 |
| $La_2O_3$ | 0 | 0 | 0 | 0 | 0 | 1.0 | 1.0 | 1.0 | 0 | 0 |
| $P_2O_5$ | 5.1 | 5.1 | 5.1 | 5.0 | 5.1 | 5.1 | 5.1 | 5.1 | 5.1 | 5.1 |
| BaO | 7.6 | 7.6 | 7.6 | 7.6 | 7.6 | 7.6 | 7.6 | 5.6 | 5.6 | 4.6 |
| $Nb_2O_5$ | 1.0 | 2.0 | 4.0 | 0 | 0 | 0 | 4.0 | 4.0 | 4.0 | 4.0 |
| $Ta_2O_5$ | 0 | 0 | 0 | 0 | 0 | 0 | 0 | 0 | 0 | 0 |
| $Y_2O_3$ | 0 | 0 | 0 | 0 | 0 | 0 | 0 | 0 | 0 | 0 |
| $Gd_2O_3$ | 0 | 0 | 0 | 2.4 | 4.0 | 4.0 | 0 | 0 | 0 | 0 |
| $Li_2O$ | 0 | 0 | 0 | 0 | 0 | 0 | 0 | 0 | 0 | 0 |
| $Nb_2O_5 + Gd_2O_3$ | 1.0 | 2.0 | 4.0 | 2.4 | 4.0 | 4.0 | 4.0 | 4.0 | 4.0 | 4.0 |
| MgO + CaO + SrO + BaO | 15.2 | 15.2 | 15.2 | 15.1 | 15.2 | 15.2 | 15.2 | 11.2 | 11.2 | 9.2 |
| Sum | 100.0 | 100.0 | 100.0 | 100.0 | 100.0 | 100.0 | 100.0 | 100.0 | 100.0 | 100.0 |
| $T_A$ | 661 | 654 | 650 | 659 | 665 | 667 | 659 | 668 | 653 | 650 |
| Tg | 631 | 624 | 620 | 629 | 635 | 637 | 629 | 638 | 623 | 620 |
| Yield point | 736 | 740 | 726 | 704 | 711 | 730 | 719 | 754 | 753 | 755 |
| Expansion coefficient (50-300° C.) | 79.8 | 77.0 | 77.0 | 78.1 | 84.4 | 83.2 | 79.9 | 74.1 | 71.5 | 73.0 |
| Heat treatment temperature | Untreated | Untreated | Untreated | Untreated | Untreated | Untreated | Untreated | Untreated | Untreated | Untreated |
| Heat treatment time | | | | | | | | | | |
| $T_{400}$ | 0.36 | 0.21 | 0.11 | 0.36 | 4.74 | 1.87 | 0.12 | 0.07 | 0.12 | 7.72 |
| $T_{600}$ | 0.20 | 0.17 | 0.08 | 0.15 | 0.16 | 0.16 | 0.08 | 0.05 | 0.06 | 0.09 |
| $T_{800}$ | 0.13 | 0.09 | 0.02 | 0.11 | 0.11 | 0.10 | 0.03 | 0.01 | 0.01 | 0.01 |
| $R_{400}$ | 75.2 | 80.7 | 89.0 | — | — | — | — | — | 88.5 | — |
| $R_{600}$ | 82.6 | 85.2 | 91.6 | — | — | — | — | — | 94.4 | — |
| $R_{800}$ | 90.4 | 91.5 | 88.5 | — | — | — | — | — | 87.8 | — |
| CS | 679 | 687 | Impossible to measure | 702 | Impossible to measure | Impossible to measure | Impossible to measure | Impossible to measure | Impossible to measure | Impossible to measure |
| DOL *EDX | 13* | 14* | 13* | 10 | — | — | — | — | 27* | 30* |

TABLE 2

| | Example | | | | | | | | | |
|---|---|---|---|---|---|---|---|---|---|---|
| | 11 | 12 | 13 | 14 | 15 | 16 | 17 | 18 | 19 | 20 |
| $SiO_2$ | 57.6 | 60.6 | 59.6 | 59.6 | 59.6 | 58.7 | 64.5 | 62.1 | 69.6 | 52.9 |
| $Al_2O_3$ | 6.4 | 5.4 | 5.4 | 5.4 | 5.4 | 3.4 | 2.4 | 5.4 | 3.0 | 7.0 |
| $B_2O_3$ | 3.9 | 3.9 | 3.9 | 3.9 | 3.9 | 3.9 | 0 | 3.9 | 3.0 | 2.0 |
| MgO | 4.6 | 4.6 | 4.6 | 3.6 | 3.6 | 15.2 | 3.6 | 3.6 | 0 | 13.0 |
| $TiO_2$ | 0 | 0 | 0 | 0 | 0 | 0 | 0 | 0 | 0 | 0 |
| $ZrO_2$ | 2.5 | 2.5 | 2.5 | 2.5 | 2.5 | 2.5 | 2.5 | 0.0 | 2.5 | 0.0 |
| $Na_2O$ | 10.3 | 9.3 | 9.3 | 9.3 | 9.3 | 9.3 | 14.3 | 6.8 | 9.3 | 5.0 |
| $K_2O$ | 0 | 0 | 0 | 0 | 0 | 0 | 0 | 0 | 0 | 0 |
| $La_2O_3$ | 0 | 0 | 0 | 0 | 0 | 0 | 0 | 0 | 0 | 0 |
| $P_2O_5$ | 5.1 | 5.1 | 6.1 | 6.1 | 6.1 | 5.1 | 6.1 | 6.1 | 4.0 | 6.1 |
| BaO | 4.6 | 4.6 | 4.6 | 4.6 | 5.6 | 0 | 5.6 | 5.6 | 2.6 | 12.0 |
| $Nb_2O_5$ | 5.0 | 4.0 | 4.0 | 5.0 | 4.0 | 2.0 | 1.0 | 4.0 | 4.0 | 2.0 |
| $Ta_2O_5$ | 0 | 0 | 0 | 0 | 0 | 0 | 0 | 0 | 0 | 0 |
| $Y_2O_3$ | 0 | 0 | 0 | 0 | 0 | 0 | 0 | 0 | 0 | 0 |
| $Gd_2O_3$ | 0 | 0 | 0 | 0 | 0 | 0 | 0 | 0 | 2.0 | 0 |
| $Li_2O$ | 0 | 0 | 0 | 0 | 0 | 0 | 0 | 2.5 | 0 | 0 |
| $Nb_2O_5 + Gd_2O_3$ | 5.0 | 4.0 | 4.0 | 5.0 | 4.0 | 2.0 | 1.0 | 4.0 | 6.0 | 2.0 |
| MgO + CaO + SrO + BaO | 9.2 | 9.2 | 9.2 | 8.2 | 9.2 | 15.2 | 9.2 | 9.2 | 2.6 | 25.0 |
| Sum | 100.0 | 100.0 | 100.0 | 100.0 | 100.0 | 100.0 | 100.0 | 100.0 | 100.0 | 100.0 |
| $T_A$ | 645 | 655 | 648 | 652 | 653 | 648 | 586 | 598 | 680 | 694 |
| Tg | 615 | 625 | 618 | 622 | 623 | 618 | 556 | 568 | 650 | 664 |
| Yield point | 756 | 772 | 783 | 791 | 774 | 760 | 683.2 | 745 | 760 | 788 |
| Expansion coefficient (50-300° C.) | 73.3 | 68.3 | 68.5 | 65.6 | 67.9 | 66.5 | 94.7 | 74.1 | 61.9 | 73.3 |
| Heat treatment temperature | Untreated | Untreated | Untreated | Untreated | Untreated | Untreated | Untreated | Untreated | Untreated | Untreated |
| Heat treatment time | | | | | | | | | | |
| $T_{400}$ | 4.06 | 0.13 | 0.08 | 0.06 | 0.08 | 3.62 | 0.43 | 0.07 | 0.08 | 0.19 |
| $T_{600}$ | 0.06 | 0.05 | 0.06 | 0.04 | 0.06 | 0.37 | 0.14 | 0.05 | 0.06 | 0.15 |
| $T_{800}$ | 0.00 | 0.01 | 0.01 | 0.00 | 0.01 | 0.18 | 0.05 | 0.01 | 0.01 | 0.07 |

TABLE 2-continued

| | Example | | | | | | | | | |
|---|---|---|---|---|---|---|---|---|---|---|
| | 11 | 12 | 13 | 14 | 15 | 16 | 17 | 18 | 19 | 20 |
| $R_{400}$ | — | 87.3 | 92.5 | — | — | — | — | — | — | — |
| $R_{600}$ | — | 95.0 | 94.8 | — | — | — | — | — | — | — |
| $R_{800}$ | — | 90.0 | 90.7 | — | — | — | — | — | — | — |
| CS | Impossible to measure | Impossible to measure | Impossible to measure | Impossible to measure | Impossible to measure | 719 | — | — | — | — |
| DOL *EDX | 28* | 29* | 30* | 29* | 28* | 19 | — | — | — | — |

TABLE 3

| | Example | | | | | | | | | |
|---|---|---|---|---|---|---|---|---|---|---|
| | 21 | 22-1 | 22-2 | 23 | 24 | 25-1 | 25-2 | 25-3 | 26 | 27 |
| $SiO_2$ | 63.2 | 64.6 | 64.6 | 59.6 | 69.5 | 60.7 | 60.7 | 60.7 | 58.7 | 57.6 |
| $Al_2O_3$ | 5.4 | 5.4 | 5.4 | 5.4 | 0 | 3.4 | 3.4 | 3.4 | 3.4 | 3.3 |
| $B_2O_3$ | 3.9 | 7.0 | 7.0 | 3.9 | 7.0 | 3.9 | 3.9 | 3.9 | 3.9 | 3.9 |
| MgO | 0 | 3.6 | 3.6 | 3.6 | 3.6 | 15.2 | 15.2 | 15.2 | 7.6 | 7.4 |
| $TiO_2$ | 0 | 1.0 | 1.0 | 0 | 1.0 | 0 | 0 | 0 | 0 | 0 |
| $ZrO_2$ | 2.5 | 2.5 | 2.5 | 2.5 | 0 | 2.5 | 2.5 | 2.5 | 2.5 | 2.5 |
| $Na_2O$ | 9.3 | 6.3 | 6.3 | 8.3 | 8.3 | 9.3 | 9.3 | 9.3 | 9.3 | 9.1 |
| $K_2O$ | 0 | 1.0 | 1.0 | 1.0 | 0 | 0 | 0 | 0 | 0 | 0 |
| $La_2O_3$ | 0 | 0 | 0 | 0 | 0 | 0 | 0 | 0 | 0 | 0 |
| $P_2O_5$ | 6.1 | 2.0 | 2.0 | 6.1 | 3.0 | 5.1 | 5.1 | 5.1 | 5.1 | 5.0 |
| BaO | 2.6 | 3.6 | 3.6 | 4.6 | 3.6 | 0 | 0 | 0 | 7.6 | 7.4 |
| $Nb_2O_5$ | 7.0 | 3.0 | 3.0 | 5.0 | 4.0 | 0 | 0 | 0 | 0 | 0 |
| $Ta_2O_5$ | 0 | 0 | 0 | 0 | 0 | 0 | 0 | 0 | 2.0 | 0 |
| $Y_2O_3$ | 0 | 0 | 0 | 0 | 0 | 0 | 0 | 0 | 0 | 3.8 |
| $Gd_2O_3$ | 0 | 0 | 0 | 0 | 0 | 0 | 0 | 0 | 0 | 0 |
| $Li_2O$ | 0 | 0 | 0 | 0 | 0 | 0 | 0 | 0 | 0 | 0 |
| $Nb_2O_5 + Gd_2O_3$ | 7.0 | 3.0 | 3.0 | 5.0 | 4.0 | 0 | 0 | 0 | 0 | 0 |
| MgO + CaO + SrO + BaO | 2.6 | 7.2 | 7.2 | 8.2 | 7.2 | 15.2 | 15.2 | 15.2 | 15.2 | 14.9 |
| Sum | 100.0 | 100.0 | 100.0 | 100.0 | 100.0 | 100.0 | 100.0 | 100.0 | 100.0 | 100.0 |
| $T_A$ | 664 | 646 | 646 | 649 | 586 | 644 | 644 | 644 | 684 | 674 |
| Tg | 634 | 616 | 616 | 619 | 556 | 614 | 614 | 614 | 654 | 644 |
| Yield point | 795 | 741 | 741 | 789 | 824 | 738 | 738 | 738 | 748 | 732 |
| Expansion coefficient (50-300° C.) | 56.5 | 60.4 | 60.4 | 67.1 | 60.1 | 71.9 | 71.9 | 71.9 | 74.6 | 80.8 |
| Heat treatment temperature | Untreated | Untreated | 1100 | Untreated | Untreated | Untreated | 900 | 950 | Untreated | Untreated |
| Heat treatment time | | | 30 min | | | | 4 hours | 4 hours | | |
| $T_{400}$ | 0.09 | 64.71 | 0.128 | 0.08 | 0.11 | 20.39 | 18.14 | 21.85 | 13.51 | 45.54 |
| $T_{600}$ | 0.02 | 3.13 | 0.079 | 0.04 | 0.07 | 4.28 | 3.50 | 4.53 | 0.56 | 0.57 |
| $T_{800}$ | 0.00 | 0.01 | 0.008 | 0.00 | 0.01 | 0.39 | 0.39 | 0.38 | 0.23 | 0.14 |
| $R_{400}$ | — | — | — | — | — | — | — | — | — | — |
| $R_{600}$ | — | — | — | — | — | — | — | — | — | — |
| $R_{800}$ | — | — | — | — | — | — | — | — | — | — |
| CS | — | — | — | — | — | 652 | 644 | 631 | 611 | 664 |
| DOL *EDX | — | — | — | — | — | 22 | 24 | 24 | 12 | 7 |

As shown in Tables 1 to 3, it is seen that the glasses of the working examples are whitened to have low transmittance as compared with the glasses of the comparative examples, and additionally are glasses having improved strength by chemically strengthening.

Additionally, when sand was sandwiched between ABS resin and the glass in Example 15 which is the working example of the white glass or white strengthened glass according to the present invention, followed by rubbing, scratches were observed on the ABS resin by visual observation, but no noticeable scratches were observed on the glass in the working example of the present invention. In the other glasses in the working examples of the present invention, the similar results were obtained.

Example 2

White glass was produced by performing the same treatment as in Example 3 except that CoO was added in an amount of 17 ppm to the glass of Example 3, and this was designated as Example 28.

Samples having a size of about 30 mm×about 30 mm and a thickness of 1 mm in which top and bottom surfaces had been mirror-finished were prepared using the glasses of Example 3 and Example 28. Each 1 mm thick glass was placed on a white standard plate having L*=98.44, a*=−0.20 and b*=−0.23 (manufactured by Evers Corporation, EVER-WHITE (Code No. 9582)), and chromaticity (a*, b*) values showing hue and chroma were measured in a light source D65 with a colorimeter (manufactured by Konica Minolta, Inc.: CR400 Chroma Meter) according to L*a*b* color system measurement normalized in CIE (Commission Internationale de l'Eclairage) and also standardized in JIS (JIS X8729) in Japan. Chroma C was calculated from a* value and b* value obtained, using the following formula.

$$\text{Chroma } C(a^*,b^*) = [(a^*)^2 + (b^*)^2]^{1/2}$$

Linear transmittances $T_{400}$, $T_{600}$ and $T_{800}$ (unit: %) of light having wavelengths of 400 nm, 600 nm and 800 nm at a thickness of 1 mm were measured in the same manner as in Example 1.

The results obtained are shown in Table 4.

TABLE 4

|  | Example | |
| --- | --- | --- |
|  | 3 | 28 |
| a* | −0.33 | −0.55 |
| b* | 3.81 | 0.50 |
| L* | 97.45 | 95.10 |
| C | 3.82 | 0.74 |
| $T_{400}$ | 0.112 | 0.113 |
| $T_{600}$ | 0.084 | 0.071 |
| $T_{800}$ | 0.02 | 0.021 |

As shown in Table 4, it was found that color tone of the white glass can be adjusted by containing coloring components. Additionally, it has been found that a white glass having small C and more pure white can be obtained by using appropriate coloring components. Example of CoO was shown above, but the present invention is not limited to CoO.

Although the present invention has been described in detail and by reference to the specific embodiments, it is apparent to one skilled in the art that various modifications or changes can be made without departing the spirit and scope of the present invention. This application is based on Japanese Patent Application No. 2013-117128 filed on Jun. 3, 2013, the disclosure of which is incorporated herein by reference.

The invention claimed is:

1. A white glass comprising, in terms of mole percentage on the basis of oxides, from 50 to 73% of $SiO_2$, from 0 to 10% of $B_2O_3$, from 3 to 17% of $Na_2O$, from 0.5 to 10% of at least one of $Nb_2O_5$ and $Gd_2O_3$, and from 0.5 to 10% of $P_2O_5$, wherein a total content RO of MgO, CaO, SrO and BaO is from 2 to 25%.

2. The white glass according to claim 1, wherein a linear transmittance of light having a wavelength of 600 nm at a thickness of 1 mm is 0.5% or less.

3. The white glass according to claim 1, wherein a total light reflectance of light having a wavelength of 600 nm is 70% or more.

4. The white glass according to claim 1, wherein a surface compressive stress layer or a layer ion-exchanged from a surface thereof has a thickness of 10 μm or more.

5. The white glass according to claim 1, comprising, in terms of mole percentage on the basis of oxides, from 55 to 65% of $SiO_2$, from 0 to 8% of $Al_2O_3$, from 1 to 6% of $B_2O_3$, from 1 to 16% of MgO, from 0 to 16% of BaO, from 6 to 12% of $Na_2O$, from 0 to 5% of $ZrO_2$, from 1 to 8% of $Nb_2O_5$, and from 2 to 8% of $P_2O_5$, wherein a total content RO of MgO, CaO, SrO and BaO is from 2 to 20%.

6. The white glass according to claim 1, comprising, in terms of mole percentage on the basis of oxides, from 0.5% to 2% of $La_2O_3$.

7. An electronic device comprising the white glass according to claim 1 as a housing.

8. An exterior housing member comprising the white glass according to claim 1.

9. The white glass according to claim 1, which comprises, in terms of mole percentage on the basis of oxides, 0.5% or more of $Nb_2O_5$.

10. The white glass according to claim 9, wherein a linear transmittance of light having a wavelength of 600 nm at a thickness of 1 mm is 0.5% or less.

11. The white glass according to claim 9, wherein a total light reflectance of light having a wavelength of 600 nm is 70% or more.

12. The white glass according to claim 9, wherein a surface compressive stress layer or a layer ion-exchanged from a surface thereof has a thickness of 10 μm or more.

13. The white glass according to claim 9, comprising, in terms of mole percentage on the basis of oxides, from 55 to 65% of $SiO_2$, from 0 to 8% of $Al_2O_3$, from 1 to 6% of $B_2O_3$, from 1 to 16% of MgO, from 0 to 16% of BaO, from 6 to 12% of $Na_2O$, from 0 to 5% of $ZrO_2$, from 1 to 8% of $Nb_2O_5$, and from 2 to 8% of $P_2O_5$, wherein a total content RO of MgO, CaO, SrO and BaO is from 2 to 20%.

14. The white glass according to claim 9, comprising, in terms of mole percentage on the basis of oxides, from 0.5% to 2% of $La_2O_3$.

15. An electronic device comprising the white glass according to claim 9 as a housing.

16. An exterior housing member comprising the white glass according to claim 9.

* * * * *